United States Patent
Rodriguez Bravo et al.

(10) Patent No.: US 11,194,904 B2
(45) Date of Patent: Dec. 7, 2021

(54) SECURITY ACTIONS BASED ON MONITORED COMPUTER AND USER PHYSICAL ACTIVITIES

(71) Applicant: INTERNATIONAL BUSINESS MACHINES CORPORATION, Armonk, NY (US)

(72) Inventors: Cesar Augusto Rodriguez Bravo, Alajuela (CR); David Jaramillo, Durham, NC (US); Peeyush Jaiswal, Boca Raton, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 346 days.

(21) Appl. No.: 16/183,018

(22) Filed: Nov. 7, 2018

(65) Prior Publication Data

US 2020/0143046 A1    May 7, 2020

(51) Int. Cl.
*G06F 21/00* (2013.01)
*G06F 21/55* (2013.01)
(Continued)

(52) U.S. Cl.
CPC ........ *G06F 21/554* (2013.01); *G06F 11/3438* (2013.01); *G06F 21/31* (2013.01);
(Continued)

(58) Field of Classification Search
CPC ...... G06F 21/554; G06F 21/31; G06F 21/552; G06F 21/577; G06F 11/3438;
(Continued)

(56) References Cited

U.S. PATENT DOCUMENTS 5,960,085 A    9/1999   de la Huerga
6,014,746 A *  1/2000   Krehnke ................. G06F 21/57
                                                              726/22

(Continued)

OTHER PUBLICATIONS

"Keystroke Dynamics", Wikipedia, page last edited on May 17, 2018. Retrieved on Jun. 15, 2018 from the Internet URL: <https://en.wikipedia.org/wiki/Keystroke_dynamics>, 5 pgs.

(Continued)

*Primary Examiner* — Hosuk Song
(74) *Attorney, Agent, or Firm* — William Hartwell; Matthew M. Hulihan; Heslin Rothenberg Farley & Mesiti PC

(57) ABSTRACT

Taking security actions based on monitored computer and user physical activities includes using sensors of a computer system to identify physical activity being performed by a user of the computer system, monitoring computer system activity being performed by the computer system as the user performs the identified physical activity, determining whether the identified physical activity being performed by the user is associated with input to the computer system to cause the computer system activity being performed by the computer system, and performing processing based on determining that the identified physical activity is not associated with input to cause the computer system activity, the processing including automatically performing security measure(s) on the computer system.

20 Claims, 8 Drawing Sheets

(51) Int. Cl.
*G06F 11/34* (2006.01)
*G06F 21/31* (2013.01)

(52) U.S. Cl.
CPC ...... *G06F 21/552* (2013.01); *G06F 2221/034* (2013.01); *G06F 2221/2103* (2013.01)

(58) Field of Classification Search
CPC ....... G06F 2221/034; G06F 2221/2103; H04L 63/1416
See application file for complete search history.

(56) References Cited

U.S. PATENT DOCUMENTS

| | | | | |
|---|---|---|---|---|
| 6,088,451 | A | * | 7/2000 | He .......................... H04L 63/20 380/255 |
| 7,108,177 | B2 | | 9/2006 | Brookner |
| 7,143,444 | B2 | * | 11/2006 | Porras ..................... G06F 21/55 726/30 |
| 7,188,314 | B2 | * | 3/2007 | Mizrah ................... G06F 21/31 715/741 |
| 7,577,987 | B2 | * | 8/2009 | Mizrah ................... G06F 21/31 726/18 |
| 7,779,062 | B2 | * | 8/2010 | Waterson .............. G06F 21/554 709/200 |
| 7,823,201 | B1 | * | 10/2010 | Xu ......................... G06F 21/554 726/22 |
| 7,941,534 | B2 | | 5/2011 | de la Huerga |
| 8,695,086 | B2 | * | 4/2014 | Davis ..................... G06F 21/32 726/19 |
| 8,868,036 | B1 | * | 10/2014 | Nasserbakht ......... G06F 1/1654 455/410 |
| 9,032,536 | B2 | | 5/2015 | Keshet |
| 9,112,898 | B2 | | 8/2015 | Perez |
| 9,680,861 | B2 | | 6/2017 | Ward et al. |
| 9,712,545 | B2 | | 7/2017 | Edwards |
| 9,830,599 | B1 | | 11/2017 | Khen |
| 9,892,270 | B2 | * | 2/2018 | Chesla .................. H04L 63/145 |
| 9,998,493 | B1 | | 6/2018 | Voutour |
| 2008/0109895 | A1 | | 5/2008 | Janevski |
| 2009/0144558 | A1 | | 6/2009 | Wang |
| 2011/0029784 | A1 | | 2/2011 | Genelie |
| 2014/0344927 | A1 | | 11/2014 | Turgeman |
| 2017/0177908 | A1 | | 6/2017 | Roper et al. |
| 2017/0223049 | A1 | | 8/2017 | Kuperman et al. |
| 2017/0286671 | A1 | | 10/2017 | Chari et al. |

OTHER PUBLICATIONS

Suguna et al.; "Unpriviliged Black Box Detection of User-Space Keyloggers", Inter. Jour. of Engineering and Computer Science, vol. 3, Issue 10, Oct. 2014, pp. 8812-8820.

Angel et al.; "Defending Against malicious Peripherals With Cinch", 25th USENIX Security Symposium On, Aug. 10-12, 2016, pp. 397-414.

Jang, Gil Han; "Customizable Method of Automatically Detecting Malicious . . . Applications", Washington and Lee University Library, Hornors Thesis, Jul. 29, 2015, pp. 1-39.

Venkatesh et al.; "User Activity Monitoring Using Keylogger", Asian Journal of Information Technology, vol. 15, Isue 23, 2016, pp. 4758-4762.

"Duckhunting—Stopping Automated Keystroke Injection Attacks", COMPSEC, Oct. 26, 2016. Retrieved on Oct. 16, 2018 from the Internet URL: <http://konukoii.com/blog/2016/10/26/duckhunting-stopping-automated-keystroke-injection-attacks/>, 9 pgs.

"DuckHunter—Prevent RubberDucky (or other keystroke injection) attacks." Retrieved on Oct. 16, 2018 from the Internet URL: <https://github.com/pmsosa/duckhunt>, 3 pgs.

Benchoff, B., "Duckhunting—Stopping Rubber Ducky Attacks", Hackaday, Oct. 28, 2016. Retrieved on Oct. 16, 2018 from the Internet URL: <https://hackaday.com/2016/10/28/duckhunting-stopping-rubber-ducky-attacks/>, 13 pgs.

"USB Rubber Ducky", HAK5. Retrieved on Oct. 16, 2018 from the Internet URL: <https://hakshop.com/products/usb-rubber-ducky-deluxe>, 4 pgs.

"Cost of a Data Breach Study", IBM Security. Retrieved on Oct. 16, 2018 from the Internet URL: <https://www.ibm.com/security/data-breach>, 6 pgs.

"6 Reasons Why the Global Ponemon 2017 Cost of Data Breach Study is a "Must Read"", IBM | Ponemon Cost of Data Breach 2017. Retrieved on Oct. 16, 2018 from the Internet URL: <https://www.ibm.com/security/infographics/data-breach/>, 13 pgs.

Fernando, I., "The human face of Artificial Intelligence", IBM, Sep. 27, 2017. Retrieved on Oct. 16, 2018 from the Internet URL: <https://www.ibm.com/blogs/ibm-anz/digital-humans/>, 9 pgs.

Beckman, K., "Automatically log off idle users in Windows", 4SYSOPS, Mar. 26, 2015. Retrieved on Oct. 16, 2018 from the Internet URL: <https://4sysops.com/archives/automatically-log-off-idle-users-in-windows/>, 33 pgs.

"Automatically log off users when logon time expires (local)", Microsoft | Docs, Sept. 9, 2008. Retrieved on Oct. 16, 2018 from the Internet URL: <https://docs.microsoft.com/en-us/previous-versions/windows/it-pro/windows-2000-server/cc938001(v=technet.10)>, 1 pg.

Mundhra, A., "How to Automatically Log Off or Lock Your Windows PC With Auto Lock", Guiding Tech, May 21, 2012. Retrieved on Oct. 16, 2018 from the Internet URL: <https://www.guidingtech.com/11583/automatically-lock-or-log-off-windows-pc-auto-lock/>, 3 pgs.

Mell, Peter, et al., "The NIST Definition of Cloud Computing", NIST Special Publication 800-145, Sep. 2011, Gaithersburg, MD, 7 pgs.

\* cited by examiner

| Activity 1 | Activity 2 | Result |
|---|---|---|
| User is present but hands are away from keyboard/mouse | Keystroke/mouse movement detected | Incompatible |
| User away from device | Keystroke/mouse movement detected | Incompatible |
| User using mouse and eating or doing other activity with other hand | Keystroke detected | Incompatible |
| Device status is idle<br>User is away | Keystroke detected | Incompatible |
| No keystroke sound detected | Keystroke detected | Incompatible |
| User is away | Login attempt detected | Incompatible |
| User is away | New application launched | Incompatible |
| User is away | New network port enabled | Incompatible |
| Associated IoT device (secondary) detects user usage | User main device (desktop/laptop) registers user activity | Incompatible |
| User is typing on main device | User activity detected on another user IoT device (requiring user input) | Incompatible |
| Iot Device reports user is sleeping | Activity detected on user's primary device (desktop/laptop) | Incompatible |
| User talking on phone while next to computer and viewing computer display | Keystroke detected | Compatible |

FIG. 4

SECURITY ACTIONS BASED ON MONITORED COMPUTER AND USER PHYSICAL ACTIVITIES

BACKGROUND

There are several mechanisms by which malicious entities remotely inject commands into a computer system, examples of which include viruses, Trojans, worms, ActiveX controls, infected web browsers or pages, exploited or malicious internet plug-ins, and others. In some cases, hackers leverage a USB storage device to inject code into a computer. In particular, keyboard drivers may be used by an arbitrary USB device to spoof a keyboard in order to inject malicious keyboard input. Under current approaches, this goes undetected by antivirus programs installed on the computer, thus posing a security risk. What is needed are approaches to address these situations.

SUMMARY

Shortcomings of the prior art are overcome and additional advantages are provided through the provision of a computer-implemented method. The method uses sensors of a computer system to identify physical activity being performed by a user of the computer system. The method monitors computer system activity being performed by the computer system as the user performs the identified physical activity. The method also determines whether the identified physical activity being performed by the user is associated with input to the computer system to cause the computer system activity being performed by the computer system. The method then performs processing based on determining that the identified physical activity is not associated with input to cause the computer system activity. The performing processing includes automatically performing security measure(s) on the computer system. This has an advantage at least in that it can identify physical activity-computer system activity correlations that are considered risky, or at least that have not been legitimized as being safe, enabling security measures to be automatically performed that would mitigate or eliminate risk posed by the computer system activity, which may be malicious.

Further, a computer system is provided that includes a memory and a processor in communication with the memory, wherein the computer system is configured to perform a method. The method uses sensors of a computer system to identify physical activity being performed by a user of the computer system. The method monitors computer system activity being performed by the computer system as the user performs the identified physical activity. The method also determines whether the identified physical activity being performed by the user is associated with input to the computer system to cause the computer system activity being performed by the computer system. The method then performs processing based on determining that the identified physical activity is not associated with input to cause the computer system activity. The performing processing includes automatically performing security measure(s) on the computer system.

Yet further, a computer program product including a computer readable storage medium readable by a processing circuit and storing instructions for execution by the processing circuit is provided for performing a method. The method uses sensors of a computer system to identify physical activity being performed by a user of the computer system. The method monitors computer system activity being performed by the computer system as the user performs the identified physical activity. The method also determines whether the identified physical activity being performed by the user is associated with input to the computer system to cause the computer system activity being performed by the computer system. The method then performs processing based on determining that the identified physical activity is not associated with input to cause the computer system activity. The performing processing includes automatically performing security measure(s) on the computer system.

In some examples, the method tracks user physical activity and user interactions with the computer system, and maintains, based at least on the tracking, a user activity profile, where the user interactions include characteristics of input to the computer system via one or more peripheral devices. This has an advantage at least in that observed interactions with the computer system can be identified as being abnormal or atypical as compared to the user's typical, tracked user interactions, thereby suggesting the observed interactions are perhaps not interactions on the part of the user but are instead malicious activity.

The determining whether the identified physical activity being performed by the user is associated with input to the computer system to cause the computer system activity being performed by the computer system can include determining whether the identified physical activity and the computer system activity are indicated as being compatible in the user activity profile for the user. The user activity profile can include stored activity patterns correlating respective user physical activities to respective computer system activities and indicating whether correlated user physical activities and computer system activities are compatible. Tracking user activity and interaction with the computer and storing this in the user profile to indicate legitimate activity patterns of the user has an advantage at least in that it can more enable identification of whether observed physical activity-computer activity correlations are typical or legitimate for this user. Correlations not in the user profile could be suggestive that malicious activity is afoot.

Security measure(s) can include sending an alert to the user, the alert prompting the user to indicate whether the computer system activity is malicious. Based on the user indicating that the computer system activity is not malicious, the method can add to the user profile an activity pattern correlating the indicated physical activity to the computer system activity and indicating that the correlated identified physical activity and computer system activity are compatible. This has an advantage at least in that it provides a way for users to define and store compatible activities for the system, providing the user some authoritative control and improving the system's accuracy in distinguishing between malicious and legitimate activities.

Based on observing atypical user interaction as part of the tracked user physical activity and user interactions, the method can invoke the identifying the physical activity, the monitoring the computer system activity, and the determining whether the identified physical activity is associated with the input. Triggering the identifying, monitoring, and determining in this manner after identifying atypical user interaction has an advantage at least in that it can avoid additional unnecessary processing.

Based on observing atypical user physical activity or user interaction in comparison to the user activity profile, the method can send to the user a challenge that prompts the user to respond within a given amount of time to avoid triggering another security measure on the computer system. This has an advantage at least in that it gives an opportunity to the user to indicate to the system that the observed atypical physical or interaction is legitimate, and therefore avoid taking unnecessary security measures.

In some embodiments, the method includes triggering another security measure on the computer system based on determining that an application executing on the computer system is rated for privacy and based further on detecting from the tracked user activity that the user is engaging in a predefined physical activity. This has an advantage at least in that it can identify when the user is engaging in activity that is considered a risk to a program rated as sensitive, and signal that the computer system/application is to take security measures to mitigate or eliminate the risk.

The security measure(s) taken can include disabling at least some peripheral device input to the computer system, which has an advantage at least in that it can overcome injection attacks presented via peripheral devices. Additionally or alternatively, the security measure(s) taken can include locking the computer system, logging the user out of the computer system or a secure area, and/or invoking a screensaver. These measures have an advantage at least in that they can implement a near-immediate remedial measure to combat an in-process attack.

In some additional aspects, the method can identify additional physical activity of the user, the additional physical activity including the user being a threshold distance from the computer system, the user engaging in a predefined physical activity, and/or the user having not provided input to the computer via one or more peripheral devices for at least a threshold amount of time. Based on identifying that additional physical activity, the method can perform another security measure on the computer system activity, the another security measure temporarily disabling at least some peripheral device input to the computer system while the additional physical activity is ongoing. This has an advantage at least in that particular physical activities can be defined that would cause automatic disabling of functions (via peripheral devices) that should not be possible while those particular physical activities are ongoing.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4 depicts an example matrix of activity patterns, in accordance with aspects described herein;

DETAILED DESCRIPTION

Figure 1:
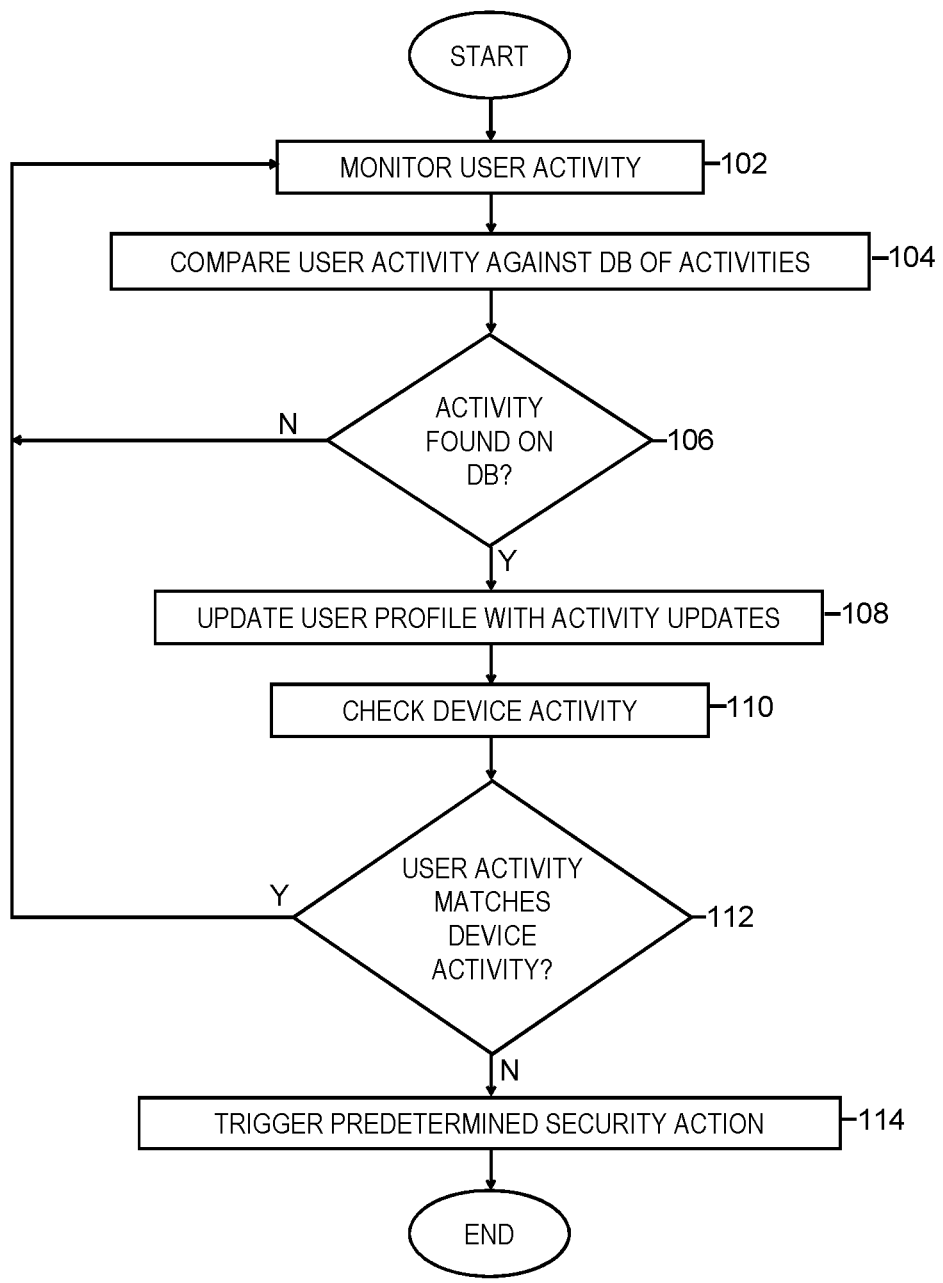
FIG. 1 depicts an example process for triggering security actions based on misalignment between user and device activities, in accordance with aspects described herein.

Some attacks involve a malicious entity (e.g. a hacker) leveraging a USB storage device to inject code into a computer by using native USB keyboard drivers. The computer's operating system, believing the USB device to be a keyboard based on how the USB device presents itself to the operating system, might regard the injection as keystroke input. This approach can sometimes inject 1000 words or more per minute, making it an efficient attack in terms of the potential for damage in a relatively short amount of time, and an effective attack because it may go undetected by the operating system.

Described herein are approaches for checking computer activity against observed user activity to identify misalignment or incompatibility therebetween. When computer activity does not align with observed user activity, this can suggest malicious activity is afoot. For instance, if a user is holding an object with two hands in front of the computer system yet the computer system is receiving what appears to be keystroke input from a peripheral device purporting to be a physical keyboard, this suggests that the observed 'keystrokes' may not be legitimate keystroke input.

Aspects can enhance data security, for instance integrity of data and confidentiality of data, and data privacy by automatically deploying security and privacy actions/measures based on user activity and device status.

In an embodiment, the computer system identifies the tasks performed by the user when in front of the computer, for example identifies that the user is typing, using the mouse, eating, staring at the screen, talking with another person in proximity to the user, talking on the phone, or reading, as examples. Additionally or alternatively, other physical activity or status of the user relative to location of the computer can be identified, for instance that the user is away from the computer. In some embodiments, components, such as sensors, of the computer system are used to identify user physical activity being performed by the user. For instance cameras, microphones, accelerometers, proximity sensors, light sensors, or any other I/O or peripheral devices may be leveraged to identify the user's physical activity.

The computer system can also check the status of the device/computer system (e.g. idle, mouse movement, keystroke input, application launch or other events, etc.), and determine what, if any, association exists between this monitored computer system activity/device status and the identified user physical activity. Such associations may be stored as defined activity patterns. For instance, the system checks whether the user activity is consistent with the device status, and, if not, triggers, initiates, and/or performs predetermined security actions/measures. If the user is away from the computer and a keystroke is detected, the system could trigger predetermined action(s) to log out, sign off, send alert(s), and/or other actions, for instance.

Additionally or alternatively, aspects can block and/or disable specific drivers or driver types, such as Human Interface Device (HID) drivers, in defined situations, such as when the user is not present in front of the computer and/or when the user has not touched the keyboard for a predetermined period of time, as examples.

Aspects also present capabilities for a user to create/define user-specific activity patterns that are portable between user devices, for instance by way of a remote facility to which the patterns can be stored and from which the patterns can be retrieved, e.g. as part of a maintained user profile. This enables a user to apply any such activity patterns to the new device and thereby secure it in accordance with aspects described herein.

In some embodiments, software executing on the user's computer system performs aspects described herein. Thus, monitoring/identifying user activity, monitoring/identifying device activity, triggering predetermined security actions, and/or other aspects described herein can be performed by agent(s) or other software installed locally on the user's computer system. Alternatively, some backend processing could be performed in a cloud or other environment, with results being provided to the user device to assist in performing actions described herein.

Some aspects also track and observe user interaction and patterns of use of the computer system. As an example, the system could check how frequently or how much time the user spends on each activity in association with a calendar, and trigger action(s) and alerts when deviations are observed. One such action could be to invoke processing that performs the comparisons of identified user activity against computer system activity as described herein.

By way of specific example, the following Table 1 below depicts tracked user interaction (in minutes) for 6 actions across 5 days of the week. The numbers represent an average time spent doing that activity on each weekday, across several weeks:

the likelihood that the activities coincide, e.g. that legitimate user behavior is causing the observed computer system activity. One example of (in)compatibility is if the user activity would render it impossible for the user to be performing action like supplying input that causes the computer system activity, for instance when the user's hands are performing one activity but data entered apparently from a physical keyboard is being received and no other users are present.

However, compatibility need not be defined by what is physically or theoretically possible, and could be based on some level of plausibility or probability that the two activities are related. For instance, it may be an uncommon situation for a user to provide mouse input while typing on a keyboard. In this case, the user physical activity of moving a mouse, to provide mouse input which is also observed as computer system activity, may be deemed incompatible with a computer activity of receiving purported keystroke data, and this incompatibility may be user-specific and based on what has been typically observed from this user in the past. For another user, for instance who regularly uses a graphic design software in which keyboard-mouse combinations are frequently used, such activity combination may be commonplace and therefore 'compatible'. Other examples of potential incompatibility include using the mouse (computer activity of receiving mouse events/input) while reading (the user physical activity), and typing (computer activity of receiving keystroke input) while eating (the user physical activity).

If atypical user interaction, deviation from an observed pattern, and/or incompatibility between user activity and

TABLE 1

| Action | Monday | Tuesday | Wednesday | Thursday | Friday |
|---|---|---|---|---|---|
| Typing | 120 min | 100 min | 200 min | 120 min | 60 min |
| Mouse usage | 200 min | 200 min | 160 min | 200 min | 300 min |
| Watching Screen | 300 min | 300 min | 380 min | 330 min | 270 min |
| On phone | 240 min | 30 min | 30 min | 180 min | 60 min |
| Reading (papers) | 90 min | 45 min | 20 min | 50 min | 120 min |
| Away | 80 min | 80 min | 75 min | 80 min | 100 min |

Based on the example Table 1 above, a given user has relatively low usage of the keyboard (Typing) on Fridays, so if one Friday the usage is above some threshold (say 120 min), the system could execute predetermined action(s) to detect if the increase was due to, e.g., a keystroke injection attack, or instead whether it is a 'false positive'. In some examples, the system logs the user off when a threshold amount of typing (i.e. purported keystroke input to the computer system) on a Friday is observed. Additionally or alternatively, this observation is used to trigger a message to the user prompting the user to indicate whether the typing on the given Friday is legitimate. As yet another possibility, the observation could trigger the system to perform additional checks, for instance capture images in front of the computer to see whether the user is sitting in front of the computer.

Exceptions could be made in this example for holidays and other important days. For example, if the user performs payroll activity, usage patterns might change significantly on paydays. The system could track that and refrain from raising alerts if atypical interaction is observed.

As noted, user patterns ("activity" patterns) could be constructed in regard to combinations of activities, for instance activities that are deemed compatible or incompatible. Compatibility between activities could be a gauge as to computer activity is found, then in some embodiments a message is triggered and sent to the user. The user can then 'accept' it and the system could add an activity pattern to the user profile. If not accepted, the system could trigger any of various possible actions, for instance to log off (or sign out) any user logged into the system, as one example. Security measure(s) can be automatically initiated, invoked, and/or performed. Thus, a particular example of a security measure includes sending an alert to the user, where the alert prompts the user to indicate whether the computer system activity is malicious. If the user indicates that the computer system activity is not malicious, an activity pattern can be added to the user's profile to correlate an indicated physical activity to computer system activity, and indicate that the correlated physical activity and computer system activity are compatible.

As noted, aspects could trigger actions based on a single observed activity (i.e. not based on correlation to another activity per se), for instance to enhance user privacy. Examples of this include executing the system screensaver, logging the user off, or any other desired action when the user physical activity includes, e.g., talking with another person, reading, using a mobile device different from the computer system, or eating, as examples.

Thus, aspects presented herein can provide solutions to address malicious remote access software and keystroke injectors, among other forms of attacks attempting to compromise data security. Aspects can prevent attacks to the integrity and confidentiality of the data, attacks to unattended systems, attacks using virtual keyboards (which are currently undetected by antivirus software offerings), and attacks using remote code injection, as examples.

FIG. 1 depicts an example process for triggering security actions based on misalignment between user and device activities, in accordance with aspects described herein. An example of misalignment is when the device activity suggested something different from user physical activity actually being performed. In one example, the process is performed by software executing on the user's computer system. Example computer systems within the context of this application include, but are not limited to, mobile devices and traditional laptop/desktop systems.

The process monitors (102) the user activity, for instance using any desired method(s), such as face recognition, voice recognition, text-to-speech, and/or speech-to-text facilities, as examples. Thus, in some aspects, sensors of the computer system can be used to identify the physical activity being performed by the user.

The system can have a database of indicated activities that is used by the system/process to determine the user current activity, e.g. typing, eating, watching the computer, talking with another person, etc. The process compares (104) the monitored user activity against this database and determines (106) whether the monitored user activity is found in the database. If not (106, N), the process returns to 102. Otherwise, once the system identifies the physical activity (106, Y), it updates (108) the user profile with the details of the performed activity. The identified activity can therefore be indicated in the profile as a log of user activity. User physical activity and user interactions with the computer system can be tracked, and a user activity profile maintained, based on that tracking. These user interactions can include characteristics of user input being received by the computer system via one or more peripheral devices, for instance time spent typing, time spent on mouse movement, and so on.

The process also checks (110) the activity of the device/computer system. In some embodiments target device has a monitoring agent loaded thereon. The monitoring agent can be in charge of monitoring the activity of the target computer. Monitoring computer system activity (input events, mouse movement, keystrokes, programs being launched, etc.) can be performed by the computer system itself as the user (or any other entity—software, scripts, etc.) causes device activity to be performed.

The system determines (112) whether the computer activity (status) matches the user activity. In other words, a determination is made as to whether the identified physical activity being performed by the user has some particular association(s) with input to the computer system to cause (i.e. that would or is expected or required to cause) the computer system activity being performed by the computer system. For instance, computer system activity of receiving keystroke input from a physical keyboard is based on input (typing) on the keyboard to cause that input. A user holding an object with both hands (the user physical activity) does not have an association with that input (typing with the user's hands on a physical keyboard), because it is impossible or highly unlikely that the user could be typing on a keyboard when holding an object with both hands. Hence, aspect 112 of FIG. 1 determines whether the physical activity the user is doing aligns with the type of input that would cause the computer system activity. In particular examples, this includes determining whether the identified physical activity and the computer system activity are indicated as being compatible in the user activity profile for the user. As noted, the user activity profile can include stored activity patterns correlating respective user physical activities to respective computer system activities, and indicating whether correlated user physical activities and computer system activities are compatible.

If the computer activity does match (e.g. is compatible with) the user activity (112, Y), then the process returns to 102. Otherwise, (112, N) the computer activity does not match the user activity, and the process triggers (114) predetermined security action(s)/measure(s).

Therefore, processing is performed based on determining that the identified physical activity is not associated with input to cause the computer system activity, and the performed processing can include automatically performing at least one security measure on the computer system. In some examples, the security measure is sending an alert from the computer system to a user. Other examples include logging off or out of the computer, a website, an application, or other software, signing out from a critical system, disabling the computer system's network access, closing programs, invoking a screensaver, and locking or disabling operating system or application functionality, though any other desired measure is possible. In some examples, at least some peripheral device input to the computer system is disabled. For instance, USB device input could be disabled by disabling the USB drivers.

In particular cases, the predetermined privacy actions are triggered based on the user physical activity and the computer activity being mutually exclusive activities, in that it is impossible or unlikely that both activities could occur at the same time from the same user. This can be handled by defining an appropriate activity pattern, for instance to indicate that the combination of activities is incompatible. Activities of using the mouse and typing at the same time may be one example. Another example pattern indicates incompatibility between non-movement of a user's mouth and a receipt of purported user voice input to invoke processing on the computer system. The user physical activity here—non-movement of the mouth, i.e. the user being silent—is not compatible with the computer activity of receiving voice input from the user.

Figure 2:
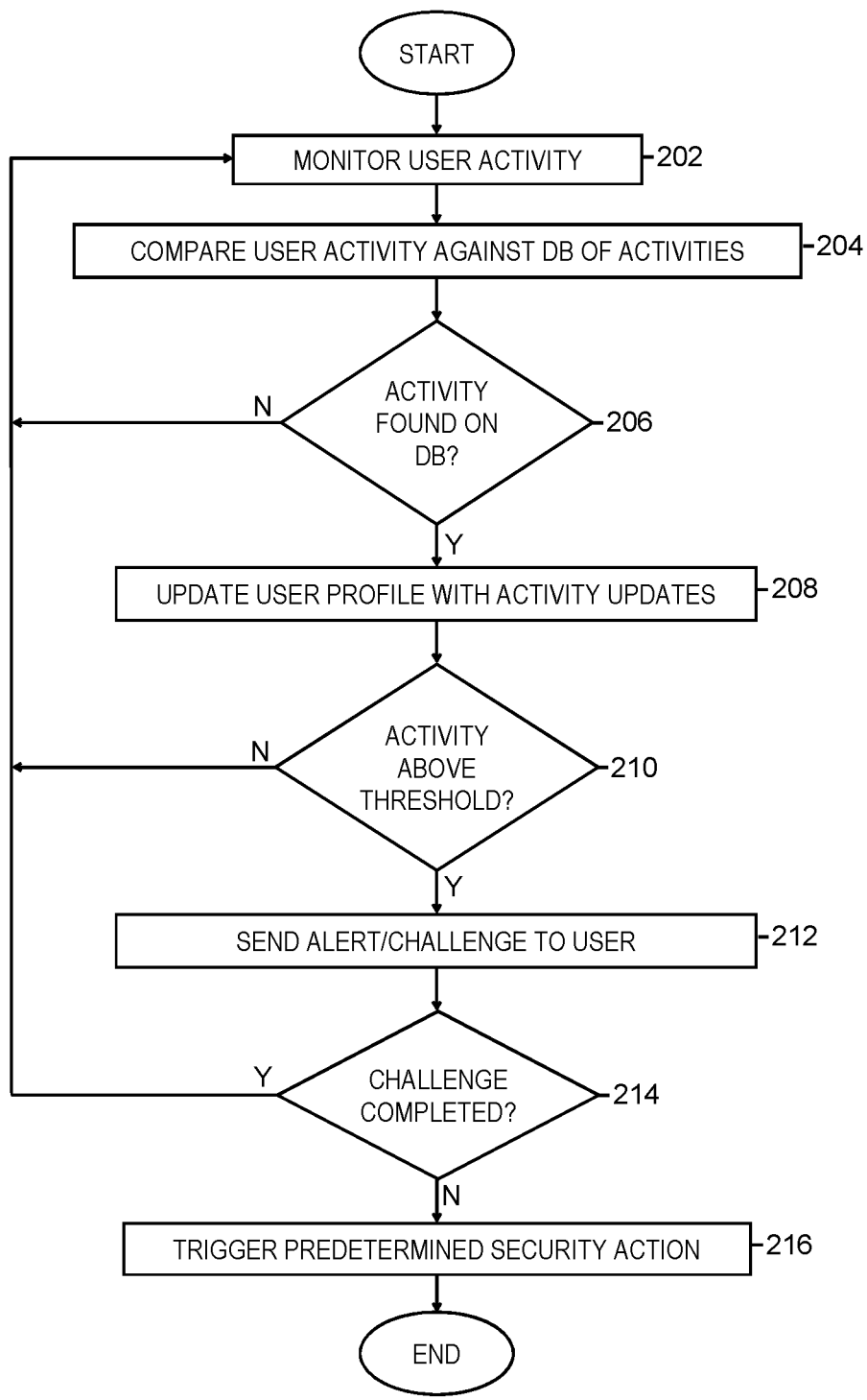
FIG. 2 depicts an example process for triggering security actions based on user activity on a computer system exceeding a threshold, in accordance with aspects described herein.

FIG. 2 depicts an example process for triggering security actions based on user activity on a computer system exceeding a threshold, in accordance with aspects described herein. The process, similar to aspects of FIG. 1, monitors (202) the user activity, compares (204) the monitored user activity against this database and determines (206) whether the monitored user activity is found in the database. If not (206, N), the process returns to 202. Otherwise, the process updates (208) the user profile with the details of the performed activity.

The process then checks (210) whether the activity is above a predetermined threshold. The threshold could be expressed as any desired data or data type, for instance a measurement of received keyboard input expressed as a number of keystrokes per minute. The threshold can be predetermined by the user or an administrator. Additionally or alternatively, the threshold could be dynamically established based on monitored user activity and/or computer activity, for instance as a rolling average that changes over time. In any case, the threshold is predetermined or previously established in that it is determined before performing aspect 210 of FIG. 2. The threshold can be/have tolerance level(s) specified by the user/admin to enhance the accuracy of the system and reduce false positives. This threshold-based determination of aspect 210 provides a way of observing whether atypical user interaction is present.

If the activity is not above the threshold (210, N), the process returns to 202. Otherwise, the activity is above the threshold (210, Y), and the process sends (212) an alert and/or challenge to the user. The challenge is in one example a pop-up window requesting the user to press a button to avoid the trigger of a predetermined security action. The process determines (214) whether the challenge is completed, for instance answered within a given amount of time. If so (214, Y), the process returns to 202. Otherwise, the challenge is not completed within the given amount of time (214, N) and the process triggers the predetermined security action (216).

Thus, based on observing atypical user physical activity or user interaction in comparison to, e.g., the user activity profile that can specify or dictate a threshold of the activity/interaction, the process sends to the user a challenge that prompts the user to respond within an amount of time to avoid triggering another security measure on the computer system.

Additionally or alternatively, based on observing atypical user interaction as part of the tracked user physical activity and user interactions, a process could invoke the processing of FIG. 1, for instance to identify further physical activity of the user, monitor further computer system activity, and determine whether that further identified physical activity is associated with the further user input.

As another example of a threshold-based approach, a process identifies physical activity of the user, where the physical activity includes the user being a threshold distance from the computer system, the user engaging in a predefined physical activity (such as talking on the phone), and/or the user having not provided input to the computer via the peripheral device(s) for at least a threshold amount of time, as examples. If any one or more of these are observed, the process can perform a security measure on the computer system based on identifying that physical activity. The security measure can temporarily disable at least some peripheral device input to the computer system while the physical activity is ongoing. By way of specific example, the system can observe that the user is a threshold distance from the computer system and automatically lock the desktop based on the user's distance from the computer system.

Figure 3:
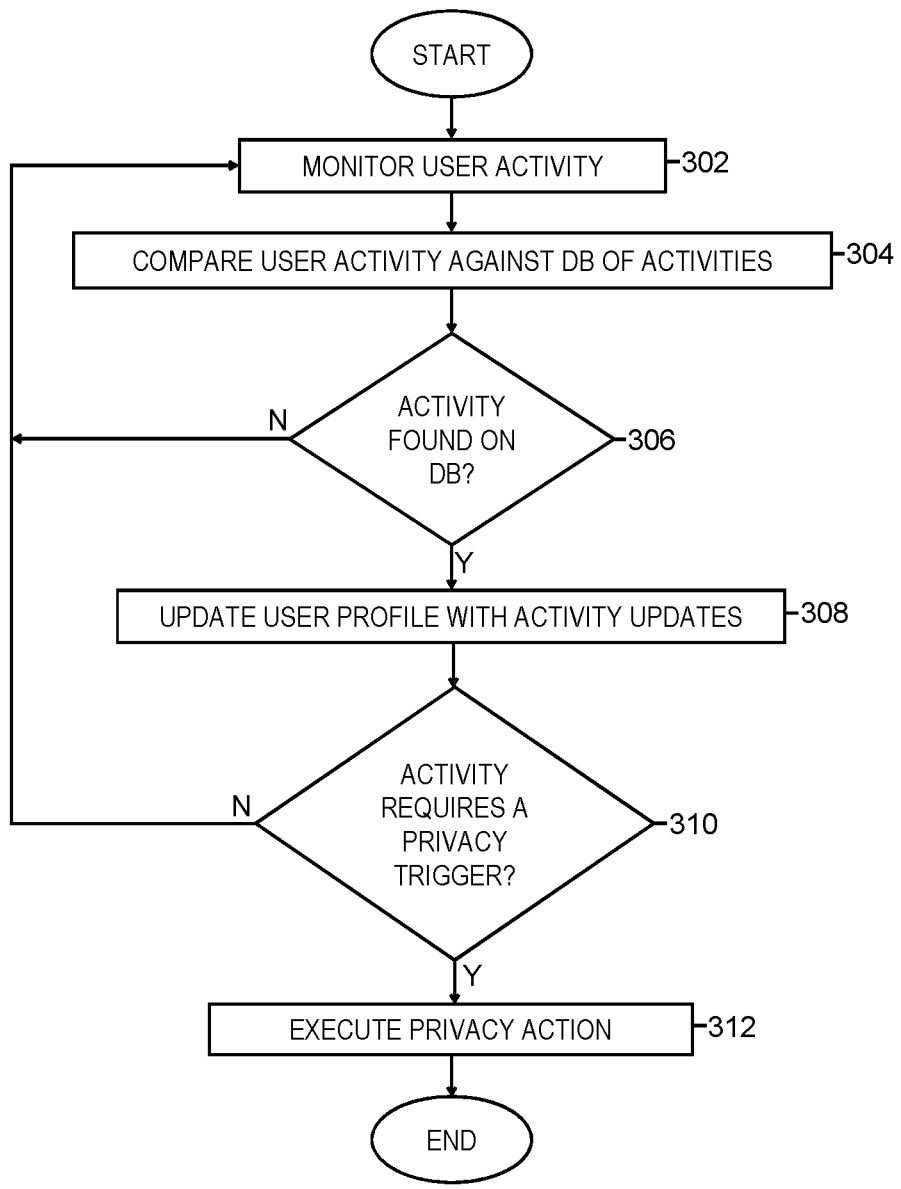
FIG. 3 depicts an example process for triggering security actions based on privacy rating of an application, in accordance with aspects described herein.

FIG. 3 depicts an example process for triggering security actions based on privacy rating of an application, in accordance with aspects described herein. In this example, security measure(s) may be triggered based on seeing that the user is not paying enough attention to a sensitive application that is open and running on the computer system.

In these aspects, some activities may be flagged per the admin or user as indicating that a level of privacy is required in connection with those activities. Activities in this sense could include interacting with applications marked as requiring privacy. The system can include a subsystem that enables a tag for processes/application rated as privacy required. If an activity/software flagged as 'privacy required' is detected and the user is not focused on the computer, the system can trigger a predetermined privacy action, for instance to log-out from a critical system such as the software, or execute the operating screensaver, as examples.

The process of FIG. 3 monitors (302) the user activity, compares (304) the monitored user activity against this database and determines (306) whether the monitored user activity is found in the database. If not (306, N), the process returns to 302. Otherwise, the process updates (308) the user profile with the details of the performed activity.

The process then determines (310) whether the activity requires a privacy trigger. If not (310, N), the process returns to 302. Otherwise (310, Y), the process executes (312) privacy action(s).

In a particular example, an application is marked as privacy required. In such as case, the process of FIG. 3 can trigger security measure(s) on the computer system based on determining that the application is rated for privacy and based further on detecting from the tracked user activity that the user is engaging in a predefined physical activity (such as not being absent from the front of the computer system, walking away from the computer system, or taking the user's eye off of the computer display for too long).

As explained herein, the system can use activity patterns defining correlations to trigger predetermined security actions. Example conceptual correlations to be implemented by activity patterns include (i) 'IF user action ≠ device activity, THEN trigger predetermined security action 1, . . . , N, and (ii) IF device status is not compatible with user status, THEN trigger predetermined security action 1, . . . , M.

In some examples, an example matrix of activity patterns is stored in the user profile. The patterns can include user-specific patterns, company/employer-defined patterns for its employee-users, generic patterns pre-established for all users, and/or a combination of the foregoing.

FIG. 4 depicts an example matrix 400 of activity patterns, in accordance with aspects described herein. Each individual row of matrix 400 is a respective activity pattern. In some examples, observation of one activity (e.g. Activity 1 or 2) of a pattern triggers a determination/check as to whether the other activity (1 or 2) of the pattern is present. In some examples, activity patterns include more than two activities.

The example of FIG. 4 includes patterns where the "Result" is incompatible, meaning it establishes that identified physical activity being performed by the user is not associated with input to the computer system to cause computer system activity being performed by the computer system. In some examples, however, such as when a user defines or adds a pattern, the Result is indicated to be compatible to explicitly indicate simultaneous performance of the activities is acceptable. Compatible activity patterns can help avoid false positives. The last activity pattern of FIG. 4 indicates compatibility. User activity in the form of the user talking on the phone is observed (for instance using image recognition to identify that the user is holding a phone up to the user's face). It is also implied, observed, or known that the user is next to the computer and is viewing the computer display, meaning the user's attention remains at least partially on the computer system. Meanwhile, keystroke input is detected. These activities are explicitly indicated in 400 as being compatible. This could avoid the system making an automatic determination as to compatibility or incompatibility if an activity pattern were not explicitly defined. An automatic determination as to compatibility or incompatibility could be performed based on machine learning or cognitive processing, either by the computer system or a remote system, to determine that such activities are normally incompatible and trigger security measures based on that automatic determination.

It is noted that some patterns in the matrix of FIG. 4 reference a user's secondary device, such as an IoT device with which the user might interact. In this manner, user physical activity can be ascertained based on observing that the user is interacting with another device and/or ascertaining what those actions are. By way of specific example, it could be determined that the user is interacting with a fitness tracker device showing the user's location to be in the next room. If data from a purported external keyboard is received on a computer system in a different room, this can suggest malicious activity.

Aspects described herein differ from, for example, technology that merely gathers user input (emotions, actions, etc.). Aspects also differ from, e.g., approaches to prevent log-on or automatically log users off of the OS and/or do so based on time policies or proximity, since aspects described herein identify physical activity being performed by the user, monitor computer system activity and determine whether the physical activity is associated with input to the computer system to cause (i.e. that does, or is expected to, cause) the computer system activity.

Figure 5:
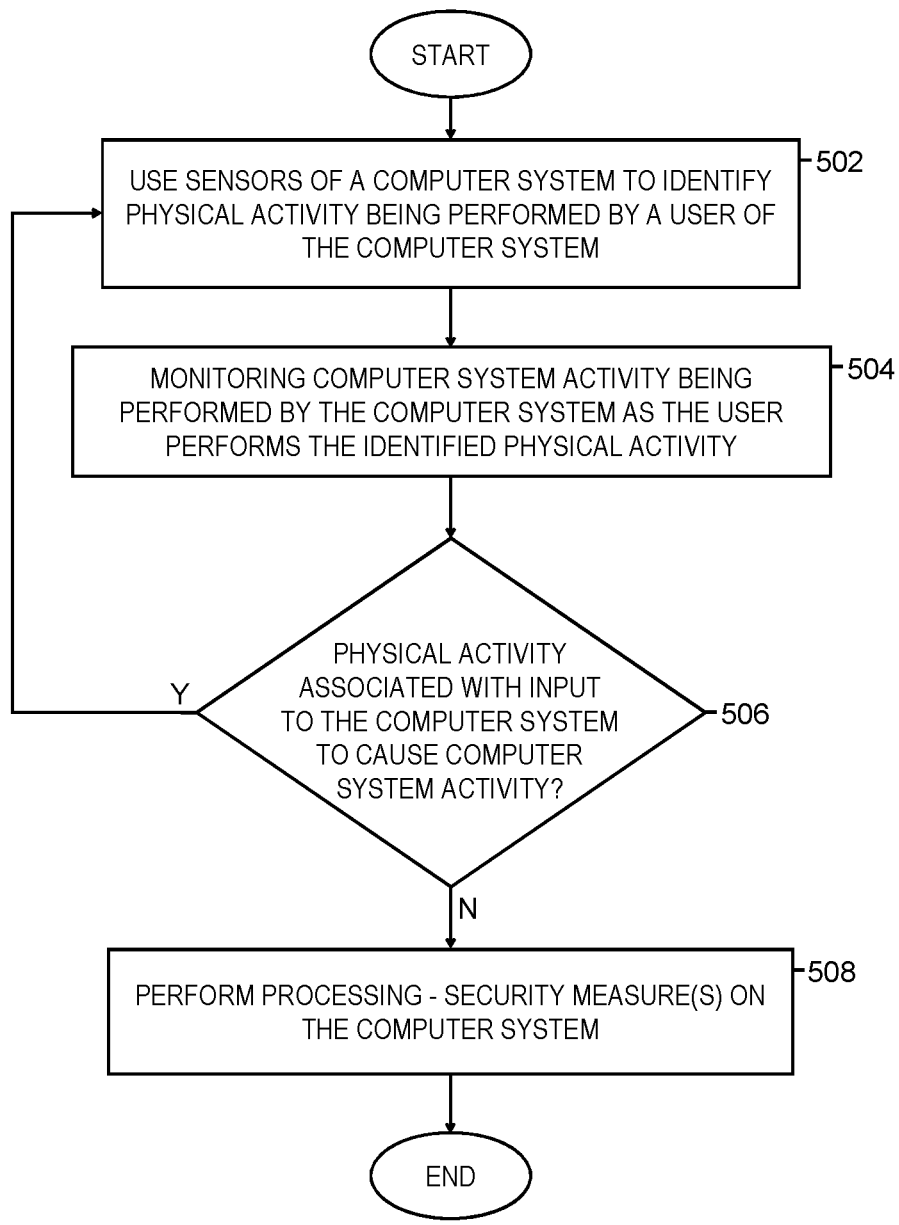
FIG. 5 depicts an example process for taking security actions based on monitored computer and user physical activities, in accordance with aspects described herein.

FIG. 5 depicts an example process for taking security actions based on monitored computer and user physical activities, in accordance with aspects described herein. In some examples, the process is performed by one or more computer systems, such as those described herein, which may include one or more user computer systems, one or more computer systems in communication therewith, for instance one or more cloud or remote computer systems, and/or one or more other computer systems.

The process uses (502) sensors of a computer system and identifies physical activity being performed by a user of the computer system. The process also monitors (504) computer system activity being performed by the computer system as the user performs the identified physical activity. The process then determines (506) whether the identified physical activity being performed by the user is associated with input to the computer system to cause the computer system activity being performed by the computer system. In particular examples, this includes determining whether the identified physical activity and the computer system activity are indicated as being compatible in a user activity profile for the user. The user activity profile can include stored activity patterns correlating respective user physical activities to respective computer system activities, and indicating whether correlated user physical activities and computer system activities are compatible. This has an advantage at least in that it can more enable identification of whether observed physical activity-computer activity correlations are typical or legitimate for this user. Correlations not in the user profile could be suggestive that malicious activity is afoot.

If it is determined at 506 that the identified physical activity being performed by the user is associated with input to the computer system to cause the computer system activity being performed by the computer system (506, Y), the process iterates by returning to 502. In this manner, the process can be a continuous process. Otherwise, if at 506 it is determined that the identified physical activity being performed by the user is not associated with input to the computer system to cause the computer system activity being performed by the computer system (506, N), then the process continues by performing processing (508). As part of this processing, the process automatically performs security measure(s) on the computer system. This has an advantage at least in that it can identify physical activity-computer system activity correlations that are considered risky, or at least that have not been legitimized as being safe, enabling security measures to be automatically performed that would mitigate or eliminate risk posed by the computer system activity, which may be malicious.

In particular embodiments, the at least one security measure includes disabling at least some peripheral device input to the computer system, such as keyboard, mouse, or other input supplied to and received by the computer system by one or more peripheral devices, which has an advantage at least in that it can overcome injection attacks presented via peripheral devices. Additionally or alternatively, the at least one security measure can include locking the computer system, logging the user out of the computer system or a secure area, and/or invoking a screensaver. Additionally or alternatively, the security measure(s) taken can include locking the computer system, logging the user out of the computer system or a secure area, and/or invoking a screensaver, which have an advantage at least in that they can implement a near-immediate remedial measure to combat an in-process attack.

In yet other embodiments, the at least one security measure includes sending an alert to the user. The alert prompts the user to indicate whether the computer system activity is malicious (or at least not explicitly allowed by the user). Based on the user indicating that the computer system activity is not malicious, the process can add to the user profile an activity pattern correlating the indicated physical activity to the computer system activity and indicating that the correlated identified physical activity and computer system activity are compatible. This has an advantage at least in that it provides a way for users to define and store compatible activities for the system, providing the user some authoritative control and improving the system's accuracy in distinguishing between malicious and legitimate activities.

The process of FIG. 5 can continue from 508 back to 502, to some other processing, or may end, as examples.

In further aspects, a process includes building a user profile. The process can track user physical activity and user interactions with the computer system, and maintain, based at least on the tracking, a user activity profile, where the user interactions include characteristics of user input to the computer system via one or more peripheral devices. This has an advantage at least in that observed interactions with the computer system can be identified as being abnormal or atypical as compared to the user's typical, tracked user interactions, thereby suggesting the observed interactions are perhaps not interactions on the part of the user but are instead malicious activity. Consequently, based on observing atypical user interaction as part of the tracked user physical activity and user interactions, the process can further include invoking processing of FIG. 5 (e.g. the identifying the physical activity, the monitoring the computer system activity, and/or the determining whether the identified physical activity is associated with the user input). Triggering the identifying, monitoring, and determining in this manner after identifying atypical user interaction has an advantage at least in that it can avoid additional unnecessary processing.

Additionally or alternatively the process can, based on observing atypical user physical activity or user interaction in comparison to the user activity profile, send to the user a challenge that prompts the user to respond within a given amount of time to avoid triggering a security measure on the computer system. This has an advantage at least in that it gives an opportunity to the user to indicate to the system that the observed atypical physical or interaction is legitimate, and therefore avoid taking unnecessary security measures.

In some aspects, a process triggers a security measure on the computer system based on determining that an application executing on the computer system is rated for privacy and based further on detecting from the tracked user activity that the user is engaging in a predefined physical activity. This has an advantage at least in that it can identify when the user is engaging in activity that is considered a risk to a program rated as sensitive, and signal that the computer system/application is to take security measures to mitigate or eliminate the risk.

As an enhancement, some aspects can identify physical activity of the user that includes the user being a threshold distance from the computer system, the user engaging in a predefined physical activity, and/or the user having not provided input to the computer via one or more peripheral devices for at least a threshold amount of time. Based on identifying such physical activity, a process could perform a security measure on the computer system that temporarily disables at least some peripheral device input to the computer system while that physical activity is ongoing. This has an advantage at least in that particular physical activities can be defined that would cause automatic disabling of functions (via peripheral devices) that should not be possible while those particular physical activities are ongoing.

Although various examples are provided, variations are possible without departing from a spirit of the claimed aspects.

Figure 6:
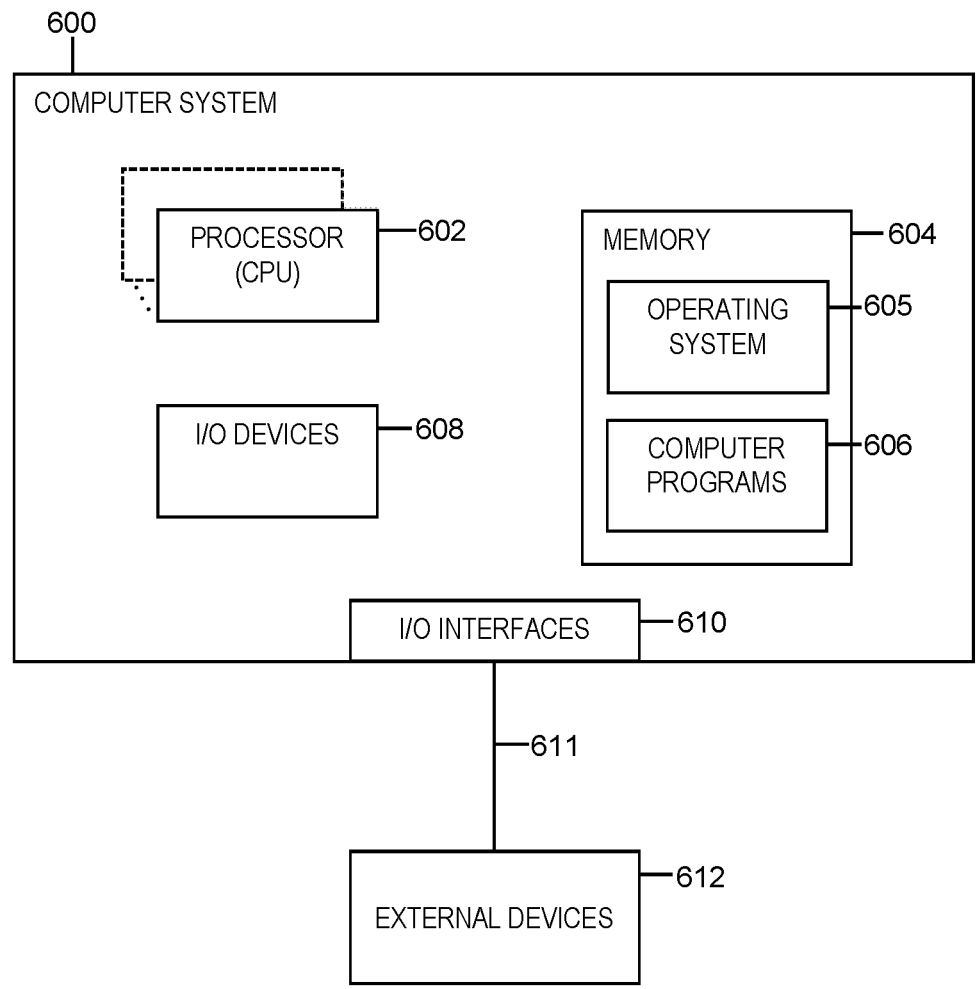
FIG. 6 depicts one example of a computer system and associated devices to incorporate and/or use aspects described herein.

Processes described herein may be performed singly or collectively by one or more computer systems, such as one or more computer systems described herein. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
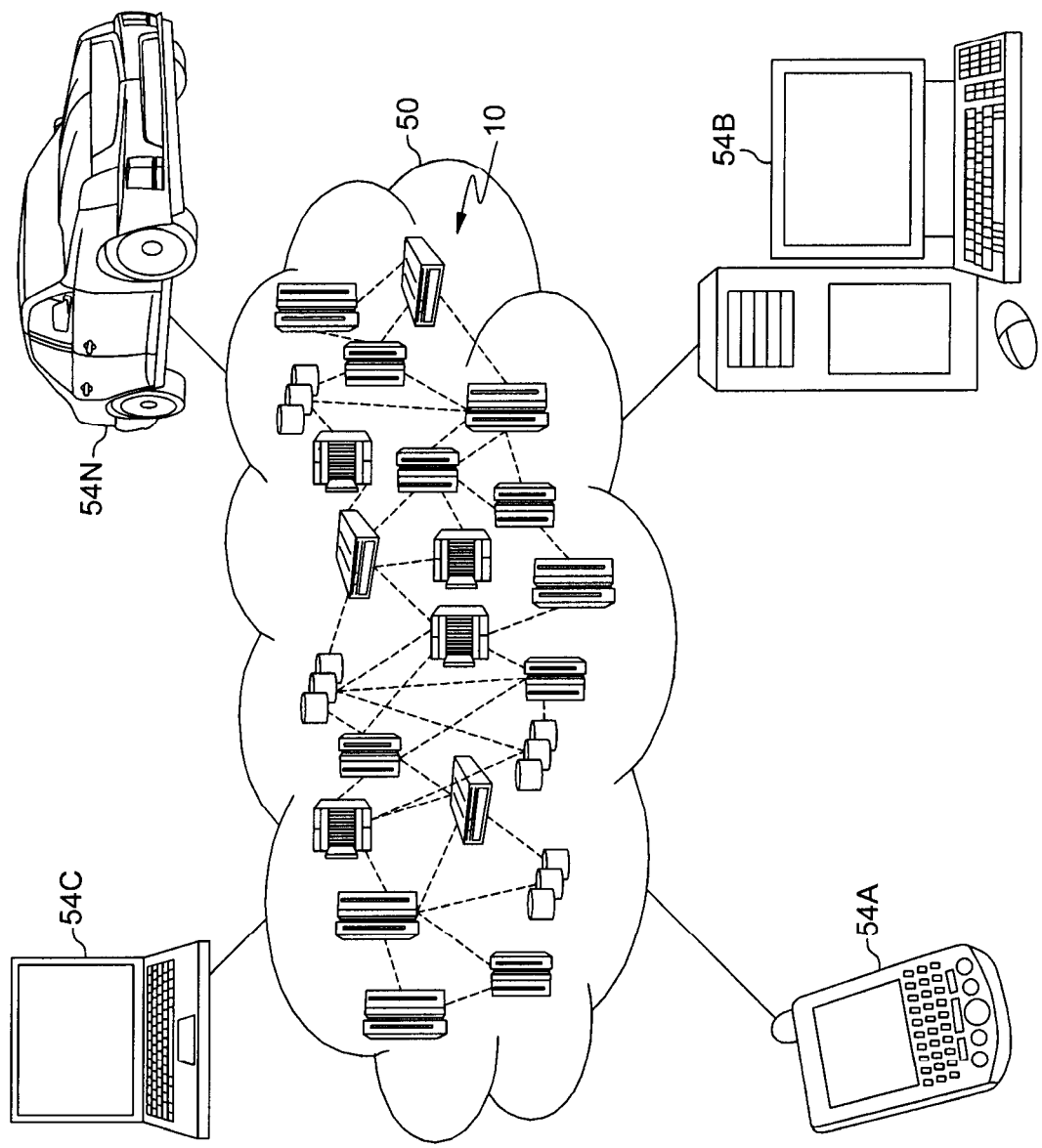
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
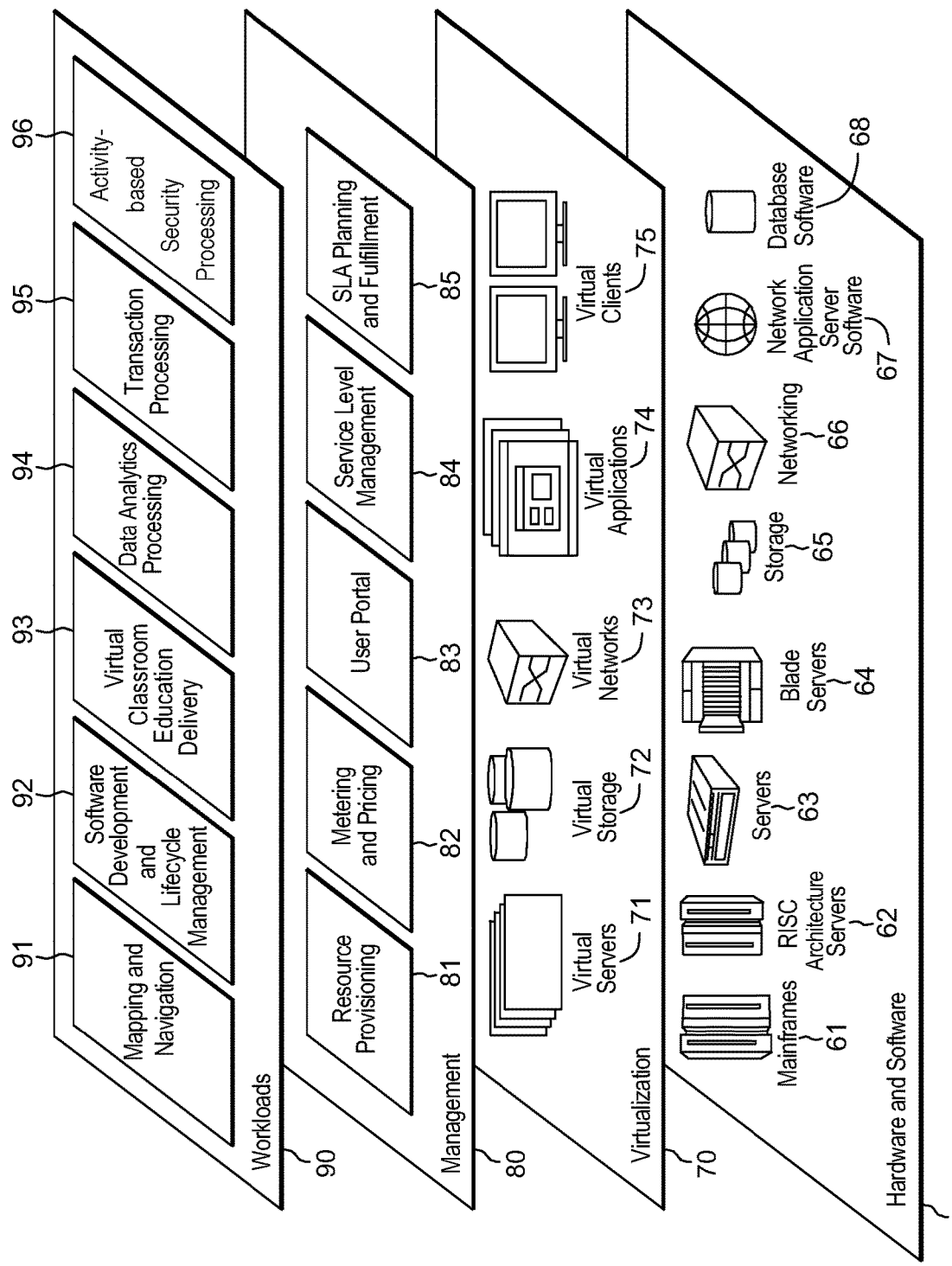
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and activity-based security processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   using sensors of a computer system to identify physical activity being performed by a user of the computer system;
   monitoring computer system activity being performed by the computer system as the user performs the identified physical activity;
   determining whether the identified physical activity being performed by the user is associated with input to the computer system to cause the computer system activity being performed by the computer system; and
   performing processing based on determining that the identified physical activity is not associated with input to cause the computer system activity, wherein the performing processing comprises automatically performing at least one security measure on the computer system.

2. The method of claim 1, further comprising tracking user physical activity and user interactions with the computer system, and maintaining, based at least on the tracking, a user activity profile, wherein the user interactions comprise characteristics of input to the computer system via one or more peripheral devices.

3. The method of claim 2, wherein the determining whether the identified physical activity being performed by the user is associated with input to the computer system to cause the computer system activity being performed by the computer system comprises determining whether the identified physical activity and the computer system activity are indicated as being compatible in the user activity profile for the user, the user activity profile comprising stored activity patterns correlating respective user physical activities to respective computer system activities and indicating whether correlated user physical activities and computer system activities are compatible.

4. The method of claim 3, wherein the at least one security measure comprises sending an alert to the user, the alert prompting the user to indicate whether the computer system activity is malicious, and wherein, based on the user indicating that the computer system activity is not malicious, the method further comprises adding to the user profile an activity pattern correlating the indicated physical activity to the computer system activity and indicating that the correlated identified physical activity and computer system activity are compatible.

5. The method of claim 2, wherein based on observing atypical user interaction as part of the tracked user physical activity and user interactions, the method further comprises invoking the identifying the physical activity, the monitoring the computer system activity, and the determining whether the identified physical activity is associated with the input.

6. The method of claim 2, wherein based on observing atypical user physical activity or user interaction in comparison to the user activity profile, the method further comprises sending to the user a challenge that prompts the user to respond within a given amount of time to avoid triggering another security measure on the computer system.

7. The method of claim 2, further comprising triggering another security measure on the computer system based on determining that an application executing on the computer system is rated for privacy and based further on detecting from the tracked user activity that the user is engaging in a predefined physical activity.

8. The method of claim 1, wherein the at least one security measure comprises disabling at least some peripheral device input to the computer system.

9. The method of claim 1, wherein the at least one security measure comprises at least one selected from the group consisting of: locking the computer system, logging the user out of the computer system or a secure area, and invoking a screensaver.

10. The method of claim 1, further comprising:
identifying additional physical activity of the user, the additional physical activity comprising at least one selected from the group consisting of: the user being a threshold distance from the computer system, the user engaging in a predefined physical activity, and the user having not provided input to the computer via one or more peripheral devices for at least a threshold amount of time; and
performing another security measure on the computer system based on identifying the additional physical activity, the another security measure temporarily disabling at least some peripheral device input to the computer system while the additional physical activity is ongoing.

11. The method of claim 1, wherein it is initially unknown to the computer system when monitoring the computer system activity whether to regard the input to the computer system as being a result of the identified physical activity being performed by the user.

12. A computer program product comprising:
a computer readable storage medium readable by a processing circuit and storing instructions for execution by the processing circuit for performing a method comprising:
using sensors of a computer system to identify physical activity being performed by a user of the computer system;
monitoring computer system activity being performed by the computer system as the user performs the identified physical activity;
determining whether the identified physical activity being performed by the user is associated with input to the computer system to cause the computer system activity being performed by the computer system; and
performing processing based on determining that the identified physical activity is not associated with input to cause the computer system activity, wherein the performing processing comprises automatically performing at least one security measure on the computer system.

13. The computer program product of claim 12, wherein the method further comprises tracking user physical activity and user interactions with the computer system, and maintaining, based at least on the tracking, a user activity profile, wherein the user interactions comprise characteristics of user input to the computer system via one or more peripheral devices.

14. The computer program product of claim 13, wherein the determining whether the identified physical activity being performed by the user is associated with input to the computer system to cause the computer system activity being performed by the computer system comprises determining whether the identified physical activity and the computer system activity are indicated as being compatible in the user activity profile for the user, the user activity profile comprising stored activity patterns correlating respective user physical activities to respective computer system activities and indicating whether correlated user physical activities and computer system activities are compatible.

15. The computer program product of claim 14, wherein the at least one security measure comprises sending an alert to the user, the alert prompting the user to indicate whether the computer system activity is malicious, and wherein, based on the user indicating that the computer system activity is not malicious, the method further comprises adding to the user profile an activity pattern correlating the indicated physical activity to the computer system activity and indicating that the correlated identified physical activity and computer system activity are compatible.

16. The computer program product of claim 13, wherein based on observing atypical user physical activity or user interaction in comparison to the user activity profile, the method further comprises sending to the user a challenge that prompts the user to respond within a given amount of time to avoid triggering another security measure on the computer system.

17. A computer system comprising:
a memory; and
a processor in communication with the memory, wherein the computer system is configured to perform a method comprising:
using sensors of a computer system to identify physical activity being performed by a user of the computer system;

monitoring computer system activity being performed by the computer system as the user performs the identified physical activity;

determining whether the identified physical activity being performed by the user is associated with input to the computer system to cause the computer system activity being performed by the computer system; and performing processing based on determining that the identified physical activity is not associated with input to cause the computer system activity, wherein the performing processing comprises automatically performing at least one security measure on the computer system.

18. The computer system of claim 17, wherein the method further comprises tracking user physical activity and user interactions with the computer system, and maintaining, based at least on the tracking, a user activity profile, wherein the user interactions comprise characteristics of user input to the computer system via one or more peripheral devices.

19. The computer system of claim 18, wherein the determining whether the identified physical activity being performed by the user is associated with input to the computer system to cause the computer system activity being performed by the computer system comprises determining whether the identified physical activity and the computer system activity are indicated as being compatible in the user activity profile for the user, the user activity profile comprising stored activity patterns correlating respective user physical activities to respective computer system activities and indicating whether correlated user physical activities and computer system activities are compatible.

20. The computer system of claim 19, wherein the at least one security measure comprises sending an alert to the user, the alert prompting the user to indicate whether the computer system activity is malicious, and wherein, based on the user indicating that the computer system activity is not malicious, the method further comprises adding to the user profile an activity pattern correlating the indicated physical activity to the computer system activity and indicating that the correlated identified physical activity and computer system activity are compatible.

* * * * *